June 20, 1933.  A. W. KILE  1,915,098
FROST SHIELD
Filed June 24, 1931
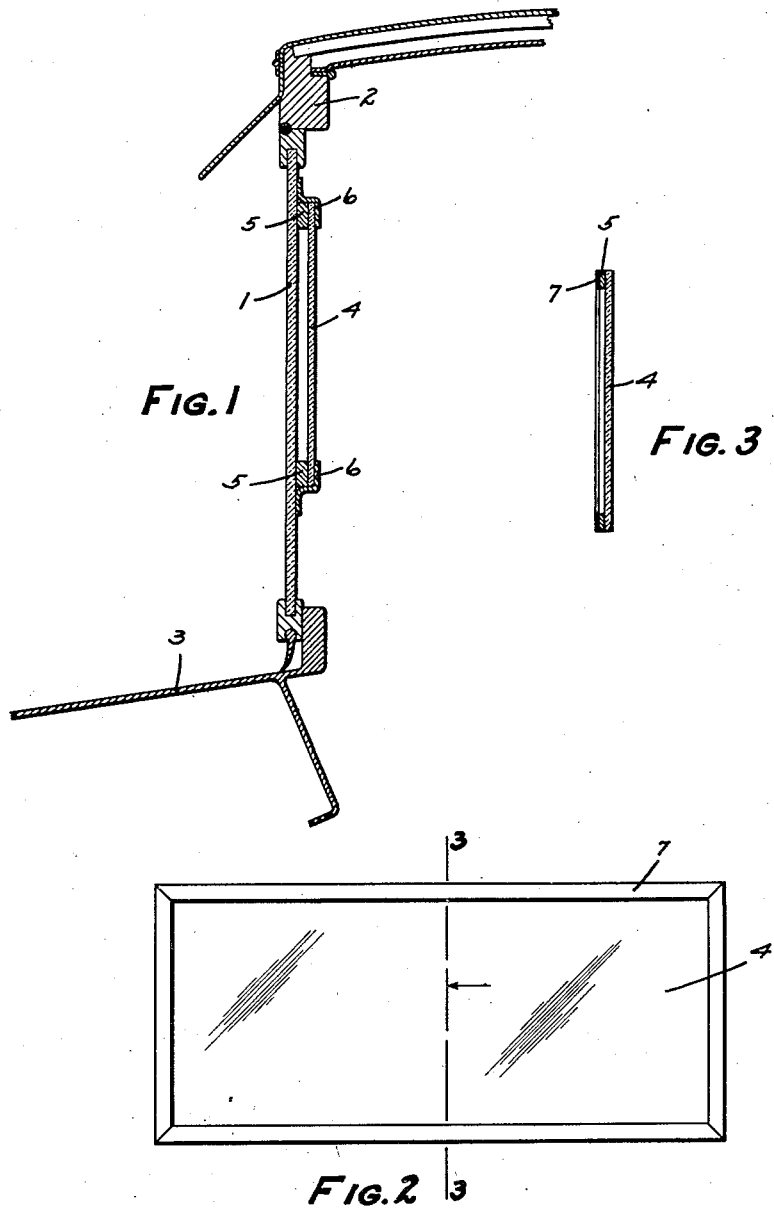
INVENTOR
ALFRED W. KILE
BY Paul, Paul & Moore
ATTORNEYS Patented June 20, 1933

1,915,098

UNITED STATES PATENT OFFICE

ALFRED W. KILE, OF MINNEAPOLIS, MINNESOTA, ASSIGNOR TO DURKEE-ATWOOD COMPANY, OF MINNEAPOLIS, MINNESOTA, A CORPORATION OF MINNESOTA

FROST SHIELD

Application filed June 24, 1931. Serial No. 546,485.

This invention relates to improvements in frost shields of the type adapted to be secured to the windshield and windows of motor vehicles, and to house windows, and the like, for preventing the formation of frost which obstructs vision therethrough.

The principal object of the invention is to provide a frost shield of simple construction which is readily attached without the use of tools and which is highly efficient in the prevention of the formation of frost.

Another object of the invention is to provide a frost shield comprising a transparent plate having a gasket or spacing element of a tacky material, said gasket or spacing element being secured by its adhesive properties to said plate and being adapted to be secured to a windshield, window, or the like.

Another object is to provide a frost shield having an adhesive gasket or spacing element on one face thereof and having adhesive means on its opposite face for securing said shield to a windshield, window, or the like.

A more specific object is to provide a frost shield comprising a plate of transparent material having a gasket or spacing element of uncured, or semi-cured, rubber on one face thereof.

A still more specific object is to provide a frost shield comprising a plate of transparent material, and a gasket or spacing element having adhesive surfaces, one of which surfaces is adapted to be secured to said plate and the other to a windshield, or the like.

Other objects of the invention and the many advantages thereof will in part be obvious and in part more fully brought out as the description proceeds.

In the accompanying drawing, I have illustrated a practical embodiment of my invention. It is to be understood, however, that I do not limit myself to the details of construction therein shown, as the invention is susceptible of embodiment in a great variety of forms without departing from the scope thereof as defined in the appended claims.

In the drawing:

Fig. 1 is a sectional view, more or less diagrammatic, of an automobile windshield showing the frost shield of my invention secured thereto;

Fig. 2 is a front view of a frost shield constructed in accordance with my invention; and Fig. 3 is a sectional view of the frost shield taken on line 3—3 of Fig. 2.

For the purpose of illustrating the mode of use and attachment of my frost shield, I have shown it in Fig. 1 secured to the windshield of an automobile. It will be understood that the frost shield may similarly be secured to the windows of an automobile, to house windows, or to any other transparent panel through which vision may be obstructed because of the formation of frost thereon.

Reference numeral 1 indicates the windshield of an automobile mounted in any usual manner between the top 2 and the cowl 3.

My frost shield includes a transparent plate 4 which may be made of glass or other rigid transparent material, or of flexible material such as celluloid. Whatever the nature of the material, the plate is preferably impervious to air so that when the plate is in position of use, a dead air space is provided between the plate and the surface to which it is secured.

Upon the surface of the plate 4 which is adapted to be positioned adjacent the windshield or window, I have secured a gasket or spacing element 5 which provides an air space between the said plate and said windshield or window when the frost shield is in use. This gasket or spacing element consists, in the embodiment illustrated, of a plurality of strips of material of desired thickness secured to a face of said plate 4 and joined at the corners by miter joints. Of course, any other form of joint at the corners may be employed which will equally well prevent leakage of air at the corners.

Uncured rubber, I have found, is an excellent material for the gasket or spacing element 5. Such material is tacky and may, therefore, by its inherent adhesive properties, be secured both to the plate 4 and the windshield 1. Moreover, when pressure is applied to the frost shield to secure it in position, the strips of the spacing element will be squeezed together at the corners to form what may be called self-welding or self-closing joints.

I do not limit myself to the use of uncured rubber as the material for the gasket or spacing element 5. Semi-cured rubber or fully cured rubber may be employed and, in such case, the strips forming the gasket will be coated on both sides with a suitable adhesive. Felt strips adhesively coated may also be used, as well as a variety of other materials. Whatever the nature of the material, it is desirable that it be of a yielding or compressible composition so that it will conform closely to the surfaces of the frost shield and windshield and form a perfect air seal.

The inherent adhesive property of the gasket material, or the adhesive substance applied thereto, may be sufficient to maintain the frost shield in proper position of use. However, it is desirable to employ additional adhesive means to secure the frost shield to the windshield. As an example, I may employ strips of adhesive tape 6 which are secured to the face of the plate 4 opposite to the gasket or spacing element 5 and which overlap and fit closely the edges of said plate and said gasket and are marginally secured to the windshield.

The adhesive strips 6, besides aiding to maintain the frost shield in position, serve as an additional safeguard against rupture of the air seal between the frost shield and the windshield. The adhesive strips 6 may be of so-called friction tape or any suitable fabric coated with a good adhesive. Fabric will be preferable, although strips of other materials may be satisfactorily employed.

For convenience in handling and to prevent deterioration, the exposed adhesive surface of the gasket or spacing element 5 may be provided with a protective covering 7. Holland cloth may be used for this purpose, as may any other suitable material which is easily removed from the adhesive surface of the gasket.

In applying the frost shield to a windshield or the like, the protective covering 7 is first removed. Then, the frost shield is firmly pressed against the windshield so as to compress slightly the gasket or spacing element 5 to assure good adhesion and a perfect air seal. The adhesive strips 6 are then applied around all the edges of the frost shield, the strips being pressed against said edges and the margins of said strips secured to the windshield.

I claim as my invention:

1. A frost shield for automobile windshields and the like, comprising a transparent plate, and a spacing element having adhesive surfaces, one of said surfaces being secured to said plate and the other being adapted to be secured to a windshield.

2. A frost shield for automobile windshields and the like, comprising a transparent plate, and strips of tacky rubber composition on one face of said plate at the edges thereof, the ends of said strips meeting at the corners of said plate and forming self-closing joints.

3. A frost shield comprising a transparent plate, a spacing element of tacky compressible material on one face of said plate, and a protective covering on said spacing element.

In witness whereof, I have hereunto set my hand this 22nd day of June 1931.

ALFRED W. KILE.